Sept. 28, 1937.  K. RÄNTSCH  2,094,330
DEVICE FOR COPYING LENTICULAR FILMS
Filed Jan. 14, 1935  2 Sheets-Sheet 1
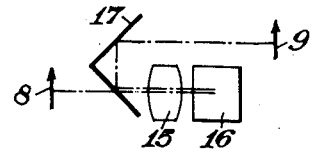
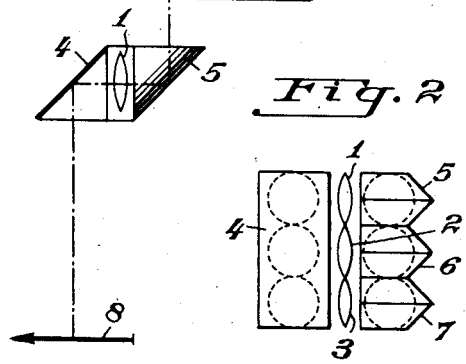
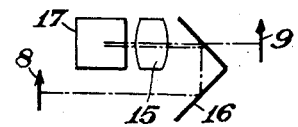
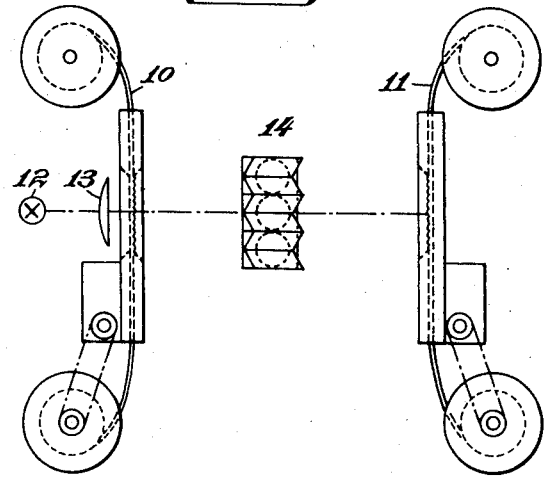
INVENTOR
Kurt Räntsch
By:- Gifford, Scull & Burgess
ATTORNEYS.

Sept. 28, 1937.  K. RÄNTSCH  2,094,330
DEVICE FOR COPYING LENTICULAR FILMS
Filed Jan. 14, 1935  2 Sheets-Sheet 2

INVENTOR
Kurt Räntsch
BY Gifford, Scull & Burgess
ATTORNEYS

Patented Sept. 28, 1937

2,094,330

UNITED STATES PATENT OFFICE 2,094,330

DEVICE FOR COPYING LENTICULAR FILMS

Kurt Räntsch, Teltow-Seehof, near Berlin, Germany, assignor to Opticolor Aktiengesellschaft, Glarus, Switzerland, a Swiss corporation Application January 14, 1935, Serial No. 1,691
In Germany January 19, 1934

5 Claims. (Cl. 88—24)

This invention relates to improvements of such devices for copying lenticular films which are described in my pending application "Device for copying by projection images on lenticulated films" (Ser. No. 731,587) which was filed on June 21, 1934. The devices described in said former application consist of at least two objectives which are so combined with plane reflecting surfaces, that each objective produces an image of the film to be reproduced on the copying film, all said images being in exact registration.

The improvement is based on the fact that the mirrors belonging to any objective are so arranged that they form a system which partially or completely turns the images. The chief advantage resulting from this new arrangement is that both the objectives and the mirrors may in a relatively simple manner be arranged and adjusted, so that sharp copies are got without disturbances between the different light beams. Other advantages will be seen from the folowing description.

Some examples of the new devices are represented in the annexed drawings.

Fig. 1 shows the plan view and

Fig. 2 the corresponding front view of the optical part of a copying device, from which Fig. 3 represents an elevation view.

Fig. 4 shows the plan view and

Fig. 5 shows the front view of one constructional element of another device.

Figure 6:
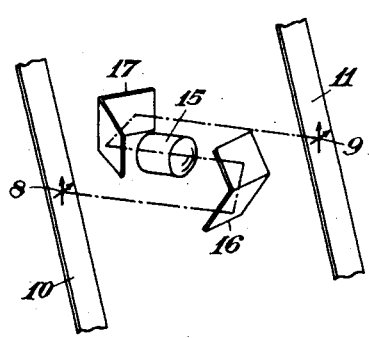

Fig. 6 gives a perspective view of the same element and

Figure 7:
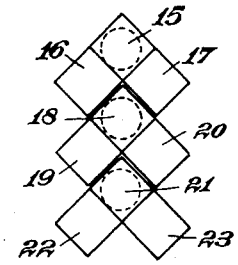

Fig. 7 serves for demonstrating the relative arrangement of three such elements.

Figure 8:
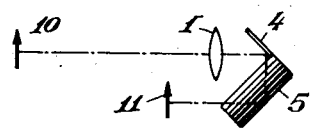
Figure 9:
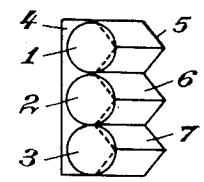
Figure 10:
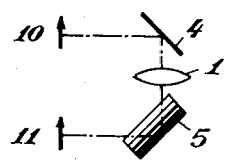
Figure 11:
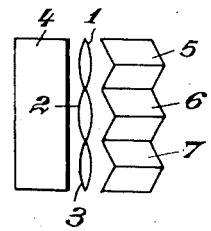

Fig. 8 and Fig. 9 as well as Fig. 10 and Fig. 11 are front and respectively plan views of two further examples.

Before the drawings are described some details must be given concerning the term "optical system turning the image".

An optical system of mirrors or the like is spoken of as to turn an image partially when either the top and the bottom or the right and left hand sides of an image are interchanged by the system. A system turns an image completely when the top and the bottom as well as the right and left hand sides of an image are interchanged. An ordinary objective turns the image completely as the top and the bottom as well as the right and left hand sides of the image are interchanged as compared with the object. When a vertical plane mirror forming an angle of about 45° with the axis of said objective is placed between the objective and the image another image of the object is produced of which the sides are turned as compared with the first named image. Therefore the second image is partially turned as compared with the object as well as with the first image. When the said plane mirror is substituted by an optical square, i. e. by two plane mirrors forming an angle of 90°, the edge of said angle intersecting the axis of said objective and forming an angle of 45° with it, a third image of the object is produced, which is neither partially nor completely turned as compared with the object. The optical square has the effect that the image is completely turned with respect to the first image, as it interchanges the sides as well as the top and the bottom.

The device which is represented in Figures 1, 2 and 3 is composed in the main by three objectives each with an optical square. The three like objectives 1, 2 and 3 are arranged one above the other, so that their principal planes coincide and consequently their axes are parallel to each other. The three axes lie in a plane which, in Figure 2, coincides with the plane of the drawings. On one side, there is disposed in front of the objectives a plane mirror 4 which cuts the optical axis at 45° and is parallel to the line joining the centres of the objectives. On the other side, at the same distance from the objectives, are three optical squares 5, 6 and 7. The latter are so arranged that the edges in which each pair of reflecting surfaces of an angle mirror at 90° to each other meet are parallel to the mirror 4. They also lie in planes which are perpendicular to the line joining the centres of the objectives.

The operation of such a system will be seen from Figure 1. The object 8 to be reproduced is at such a distance from the mirror 4 that the path of light from the object by way of this mirror to the objective is equal to twice the focal length. The objective 1, in conjunction with the mirrors 4 and 5, then projects an image 9 of the object 8 likewise at the distance of twice the focal length, this distance being measured by way of the mirror 5.

The effect of the optical square 5 is that each point of the image 9 is in the same plane perpendicular to the line joining the centres of the objectives as is the corresponding point of the object 8. Consequently, the objectives 2 and 3 together with the mirrors 4, 6 and 7 also project images of the object 8, which if the adjustment is suitable exactly coincide with the image projected by the objective 1.

Since now as indicated in Figure 2 by the dotted line circles, the three objective apertures appear one above the other both from the object 8 and from the image 9 and all rays of light which emanate from the object 8 in a direction towards one of those virtual objective apertures contribute in the reproduction, the whole system acts as one which has a large aperture in one direction. It is obvious that the number of objectives and mirrors employed may be increased and diminishing as desired: In the same way it is possible to employ for example two or even four, five or still more objectives.

It is particularly advantageous, as shown in the constructional example, to arrange the mirror 4 so that it cuts the optical axis at 45°. It is, however, also possible to arrange this mirror so that it makes any other angle with the optical axis. It is merely necessary that it should be parallel to the line joining the centres of the objectives. Also the optical squares, the edges of which must always be parallel to the mirror 4 may be at a distance from the objective different from that of the mirror 4.

Finally, it is also possible to compose the mirror 4 of a plurality of separate plane mirrors agreeing in number with the number of the objectives, in order in this way to be able more readily to compensate during adjustment small differences occurring in the focal lengths of the objectives.

To explain further how reproduction is effected by means of the new system, an arrow has been drawn in the plane of the object 8, and this arrow is so reproduced that its point coincides with the point of the arrow drawn in the image plane 9. In addition an arrow perpendicular to the plane of the drawing of Figure 1 will be so reproduced that the direction of its image agrees with the direction of the arrow itself.

The new optical system does not merely act like one with a large relative aperture, but it may also be employed for reproducing elongated objects, so that it therefore acts like a system having a very large image angle. It is in fact almost self-evident that an image of a very elongated band may be projected by means of the new device, by arranging the band in the plane of the object 8 so that its longitudinal direction is parallel to the line joining the centres of the objectives. The number of the individual objectives is then suitably adapted to the length of the band. The advantage is that it is possible by optical means to make an unturned copy which has substantially the same scale as the original without having to move the photographic camera and the surface to be exposed as far from the object as is necessary with the optical systems known heretofore.

But the main application of the new optical system is the printing of lenticular films. It is known that in printing such films an optical system must be employed which subtends at the films an angle equal to the angle subtended at the film by the color filters during taking and reproduction. Generally speaking, the relative aperture of the optical system employed during printing must be twice the relative aperture of the lenticular elements. If the films have cylindrical lenticular elements, this condition regarding the apertures must be satisfied at least in a plane which is perpendicular to the direction of the lenticular elements.

The optical system according to Figures 1 and 2 may therefore be employed by so arranging it relatively to the films that the line joining the centres of its objectives is perpendicular to the direction of the cylindrical lenticular elements. This rule may also be expressed more generally by stating that the line joining the centres of the objectives should be parallel to the direction in which the differently colored objective zones are seen adjacent each other from the film during taking or reproduction. In this form, the rule is also correct when employing spherical lenticular elements.

A copying machine for films on which the cylindrical lenticular elements are at right-angles to the longitudinal direction of the films is shown in section in Fig. 3. The original film 10 which is to be reproduced on the copying film 11 is illuminated by the light source 12 and the condenser lens 13. Between the two films is an optical system 14 of the kind shown in Figures 1 and 2. This system is placed between the films so that the optical axes are perpendicular to the plane of the drawing and the optical squares are seen behind the objectives. The number of objectives is in general adapted to the number of differently colored filter zones which during taking are reproduced by a lenticular element upon the area of the photographic layer situated behind it. If, on the contrary, for example a plurality of stereoscopically different images have been recorded behind each lenticular element, the number of the objectives is adapted to the number of these different images and in the case of stereoscopic records may therefore be for example two or even more.

In other respects, the system 14 may be regarded as an ordinary objective. The conditions regarding the position of the pupils in proportion to the position of the filter images seen from the films during taking and reproduction apply in the same way as is known for ordinary printing objectives, so that field lenses and curved film paths may be employed in the manner known per se.

The main optical elements which compose the copying device of Figure 3 are the three objectives with the three optical squares, the mirror 4 being dispensable. Thus each objective is combined with a system of mirrors performing a partial or a complete turning of the image, according as the mirror 4 is used or not. Some modifications of the device shown in Figures 1 and 2 are shown in Figures 8 and 9 and 10 and 11 in the same views as in Figures 1 and 2. Their operation follows from that described in connection with Figures 1 and 2. With these arrangements too each objective is combined with mirrors which partially turn the image. Another device with mirrors turning the image completely is shown in Figures 4 to 7.

Such a system too comprises several equivalent elements. The mutual arrangement of these elements is shown in Figure 7, whilst Figure 6 shows an individual element in perspective. Two sections at right-angles to each other through an individual element are shown in Figures 4 and 5.

The objective 15 projects an image 9 of the object 8, the rays of light passing in front of the objective by way of the angle mirror 16 and behind the objective by way of the angle mirror 17. The two angle mirrors are so arranged that their edges are at right-angles to each other and to the direction of the optical axis. The rays emanating from the object 8 therefore pass for example to the mirror 16 below the objective 15 and are then so reflected that they enter the objective as if they came from an object situated in the direction of the optical axis. The objective projects an image of this object likewise in the direction of its optical axis. Due to the effect of the angle mirror 17, however, the rays of light are so bent that they pass behind the objective 15 and are united in the plane of the image 9.

The arrows in Figures 4, 5 and 6 have been so drawn that the tip of an arrow in the original is always reproduced upon the tip of the corresponding arrow in the image. It will therefore be seen that each image arrow, in direction, extends parallel to the corresponding original arrow.

Consequently, a device composed of individual elements as shown in Figures 4, 5 and 6 is particularly well adapted for printing lenticular films. For this purpose, it is possible for example to dispose three objectives one above the other in the direction at right angles to the direction of the lenticular elements. If, in fact, an individual element is viewed in the direction of the optical axis, the two angle mirrors, as shown in Figure 7, make a right angle with each other, the objective being situated where the two mirrors lie one above the other. Such right-angled elements may be joined together after the manner of herring-bone patterns as shown in Figure 7, the objective 15 being arranged in a plane parallel to the plane of the drawing in Figure 7. The original film may be disposed at the place of the object 8 and the copying film at the place of the image 9.

In other respects, for such an optical printing system, the same remarks apply appropriately as were made hereinbefore in connection with the optical system 14.

In addition, however, it is also possible to employ an optical system composed of elements as shown in Figures 4 to 6 for reproducing large areas, it being thereby possible to secure the same advantages which were enumerated hereinbefore for the reproduction of a band-form object by means of the system 14.

Of course, the plane reflecting surfaces and the angle mirrors which are employed in the new devices may be produced either by surface reflection or by utilizing the total internal reflection at the boundary surfaces of suitable transparent bodies, for example glass.

I claim as my invention:

1. In combination, an original film having thereon a multiplicity of lenticulations of substantially equal aperture and a group of color records behind each of said lenticulations, a copy film having similar lenticulations thereon, means for projecting light through the original film to the copy film, and a plurality of optical systems disposed in the path of light passing from the original to the copy film, each of said systems comprising a lens of smaller aperture than that of a lenticulation and adapted to cooperate with said lenticulations to form an image of said records on said copy film and also comprising means to produce a turning of the image.

2. In combination, an original film having thereon a multiplicity of lenticulations of substantially equal aperture and a group of color records behind each of said lenticulations, a copy film having similar lenticulations thereon, means for projecting light through the original film to the copy film, and a plurality of optical systems disposed in the path of light passing from the original to the copy film, each of said systems comprising a lens of smaller aperture than that of a lenticulation and adapted to cooperate with said lenticulations to form an image of said records on said copy film and also comprising means to produce a turning of the image, said systems corresponding in number to the number of said records behind each lenticulation of the original film.

3. In combination, an original film having thereon a multiplicity of lenticulations of substantially equal aperture and a group of color records behind each of said lenticulations, a copy film having similar lenticulations thereon, means for projecting light through the original film to the copy film, and a plurality of optical systems disposed in the path of light passing from the original to the copy film, each of said systems comprising a lens of smaller aperture than that of a lenticulation and adapted to cooperate with said lenticulations to form an image of said records on said copy film and also comprising means to produce a turning of the image, said lenses being disposed side by side in a plane extending transversely of the lenticulations.

4. In combination, an original film having thereon a multiplicity of lenticulations of substantially equal aperture and a group of color records behind each of said lenticulations, a copy film having similar lenticulations thereon, means for projecting light through the original film to the copy film, and a plurality of optical systems disposed in the path of light passing from the original to the copy film, each of said systems comprising a lens of smaller aperture than that of a lenticulation and adapted to cooperate with said lenticulations to form an image of said records on said copy film and also comprising an optical square to produce a turning of the image.

5. In combination, an original film having thereon a multiplicity of lenticulations of substantially equal aperture and a group of color records behind each of said lenticulations, a copy film having similar lenticulations thereon, and means for projecting from the original film to the copy film a plurality of beams of light corresponding in number to the number of color records in one of said groups, each means for thus projecting a beam comprising a lens of an aperture substantially corresponding to one of said records of a group and also comprising mirrors associated with said lens and arranged to turn the image formed by the lens with which the mirrors are associated, there being a separate lens and associated mirrors for each of said beams.

KURT RÄNTSCH.